United States Patent [19]

Hardy

[11] 4,227,781
[45] Oct. 14, 1980

[54] PROJECTION LAMP CONTROL

[75] Inventor: Herbert L. Hardy, Sudbury, Mass.

[73] Assignee: Polaroid Corporation, Cambridge, Mass.

[21] Appl. No.: 33,701

[22] Filed: Apr. 26, 1979

[51] Int. Cl.³ .......................................... G03B 21/32
[52] U.S. Cl. ........................................ 352/41; 352/5; 352/72
[58] Field of Search ............... 352/5, 27, 38, 130, 352/72, 78 R, 41

[56] References Cited

U.S. PATENT DOCUMENTS

| | | | |
|---|---|---|---|
| 2,008,876 | 7/1935 | Rehder . | |
| 3,174,154 | 3/1965 | Trenchard . | |
| 3,376,093 | 4/1968 | Freudenschuss | 352/5 |
| 3,684,359 | 8/1972 | Land | 352/38 |
| 3,704,941 | 12/1972 | Winkler et al. | 352/92 |
| 3,724,935 | 4/1973 | Batter | 352/38 |
| 3,771,862 | 11/1973 | Land et al. | 352/130 |
| 3,812,515 | 5/1974 | Cook | 352/92 |
| 3,851,958 | 12/1974 | Land | 352/130 |
| 3,895,862 | 7/1975 | Stella et al. | 352/130 |
| 4,118,737 | 10/1978 | Chambers et al. | 352/130 |
| 4,141,629 | 2/1979 | Mattes | 352/27 |

OTHER PUBLICATIONS

U.S. Application Ser. No. 791,036, Filed 4-26-77, now abandoned.

Primary Examiner—Monroe H. Hayes
Attorney, Agent, or Firm—David R. Thornton

[57] ABSTRACT

A cinematographic system including a programmable viewing apparatus by which an exposed photographic film strip in a multipurpose cassette may be processed, viewed by projection, and rewound, either entirely or for a selected film length for replay, without removal from the viewing apparatus. A control circuit is provided which continuously measures the position of the film strip in the cassette and precludes projection of the leading end of the film strip in response to signals received from the electronic logic system of the viewing apparatus. The signals condition the circuit to count in either the forward or reverse direction depending upon the direction of film strip movement. The count, which corresponds to the position of the film strip, is continuously displayed by the viewing apparatus. When the count is at or below a predetermined number corresponding to the length of the leading portion, the circuit will prevent the projection lamp from turning on during a project cycle. The circuit permits immediate projection lamp turn on during a project cycle whenever the count exceeds the predetermined number.

7 Claims, 2 Drawing Figures

PROJECTION LAMP CONTROL

BACKGROUND OF THE INVENTION

This invention relates to cinematographic systems utilizing a programmable viewing apparatus by which an exposed photographc film strip contained in a multi-purpose cassette may be processed, viewed by projection and rewound, either entirely or for a selected film length for replay, without removal from the viewing apparatus. More particularly, it concerns a programmable viewing apparatus which includes a control circuit for precluding projection of the non-usable leading end portion of the film strip during the project cycle while ensuring projection of the usable portion of the film strip; at all other times a project cycle is initiated, particularly after rewind for instant replay.

Cinematographic systems employing a programmable viewing apparatus and multipurpose cassette containing a photographic film strip together with a supply of processing fluid so that the film strip may be exposed in a camera and subsequently processed and projected in the programmable viewing apparatus are the subject of several issued U.S. Patents and pending applications commonly assigned to the assignee of the present invention. For example, the U.S. Pat. No. 3,851,958, issued to Edwin H. Land on Dec. 3, 1974 described a multipurpose cassette, motion picture system while the U.S. Pat. No. 3,895,862, issued on July 22, 1975 to Joseph A. Stella et al, is directed to a cassette arrangement for the above-noted system. U.S. Pat. No. 3,771,862, issued to Edwin H. Land on Nov. 13, 1973, describes an automatic viewing apparatus with a replay control for manually interrupting the projection cycle at any point and rewinding the film for a predetermined time or film length and projecting the rewound portion.

A recent development of the viewing apparatus for such systems is exemplified by U.S. Pat. No. 4,118,737, issued Oct. 3, 1978 to Melvin T. Chambers et al. In such systems, after the film strip is exposed by mounting the cassette in a motion picture camera, the cassette is inserted into an automatic viewing apparatus capable of discerning the processed or unprocessed condition of the film strip and, in the latter case, initiating a processing mode of operation. During processing, the viewing apparatus operates to rewind the film strip from a cassette contained takeup spool back to a supply spool under a processor nozzle by which processing fluid is spread evenly over the emulsion side of the film strip.

During the projection cycle, the viewing apparatus operates to wind the film from the supply spool to the takeup spool until the end of the film strip is reached at which time the film drive system is automatically reversed to rewind the strip back onto the supply spool. An instant replay mode may be initiated when the viewing apparatus is in the project or rewind mode by manual depression of a replay button. If instant replay is selected when the viewing apparatus is in the project mode, the viewing apparatus will immediately cycle to the rewind mode and the film will rewind until the replay button is released, whereupon the viewing apparatus will cycle through an off position to the project mode. If the replay button is depressed during rewind, the viewing apparatus will cycle through the off position to the project mode.

The foregoing and other modes of operation are described in detail in the aforenoted U.S. Pat. No. 4,118,737 which is hereby incorporated by reference.

Briefly, the automated programming of diverse operating modes is effected by an integral programming disc in combination with electronic logic circuitry.

As is conventional, less than the entire length of the film strip is ever suitably exposed to result in useable frame images. For example, the leading end portion of the photographic film strip includes unwanted blank portions, projection of which is often distractive to the viewer. Heretofore, projection of the leading end portion has been precluded by providing a time delay to prevent operation of the projection lamp at the beginning of each forward projection cycle. Such a time delay, typically 7.5 seconds, is desired in commonly assigned application Ser. No. 791,036 filed Apr. 26, 1977, now abandoned.

The foregoing time delay thus prevents turn-on of the projection lamp at the commencement of each projection cycle. While such a time delay is effective to prevent projection of the non-useable leader portion of the film strip whenever projection of a fully rewound cassette is initiated, it disadvantageously delays projection for a predetermined time whenever projection of a less than fully rewound cassette is desired. Thus, whenever the replay mode of the viewer is selected to reproject a desired portion of the film strip, the time delay will inhibit the projector lamp turn-on after replay rewind for about 7.5 seconds at start of the projection cycle of the selected replay segment of the film strip.

SUMMARY OF THE INVENTION

In accordance with the present invention, a circuit is provided in the programmable viewing apparatus which eliminates the projection lamp turn-on delay except when the leader portion of the film would be visible. The position of the film is continuously measured by the circuit in response to signals received from the electronic logic system and programming disc of the viewing apparatus. The revolutions of the takeup spool of the cassette are counted in response to signals generated by the opening and closing of a switch associated with the takeup spool. The circuit is provided with counters which count in either the forward or reverse direction in response to the switch closures depending upon whether the circuit receives signals from the logic disc indicating that the viewer is in a project, rewind or off mode. The position of the film is thus continuously determined by the count which is displayed by light emitting diodes (LEDs) provided on the viewing apparatus.

When the count is below a predetermined number corresponding to the length of the leader portion, the circuit will prevent the projection lamp from energizing at the commencement of a project cycle. When the count, however, is above this predetermined number, a signal is generated by the circuit permitting the projection lamp to turn on. The circuit thus prevents projection lamp turn on during any project cycle only when a portion of leading end of film strip would be visible and allows instant projection lamp turn on when the leading end has been wound on the takeup spool or whenever a projection cycle is initiated after instant replay where only exposed film strip transparencies will be visible.

The circuit also provides an accurate means for measuring the film position by conditioning the counters to count in the forward or reverse directions depending on the input signals to the counters. After a fast rewind, the circuit compensates for the forward spring reaction of the film by conditioning the counter to count in the forward direction prior to the commencement of a project cycle. Thus the forward movement of the film after a fast rewind is counted and the exact position of the film is accurately measured.

It is therefore among the objects of the present invention to provide an improved viewing apparatus which precludes projection of only the non-useable leader portion of the cassette film while permitting immediate projection at all other times during or at the initiation of a project cycle by continuously and accurately measuring the position of the cassette film as the viewing apparatus cycles through the various programmable modes of operation.

Other objects and further scope of applicability will be apparent from the detailed description to follow taken in conjunction with the accompanying drawings in which like parts are designated by like reference numerals.

DETAILED DESCRIPTION OF THE PREFERRED EMBODIMENT

Figure 1:
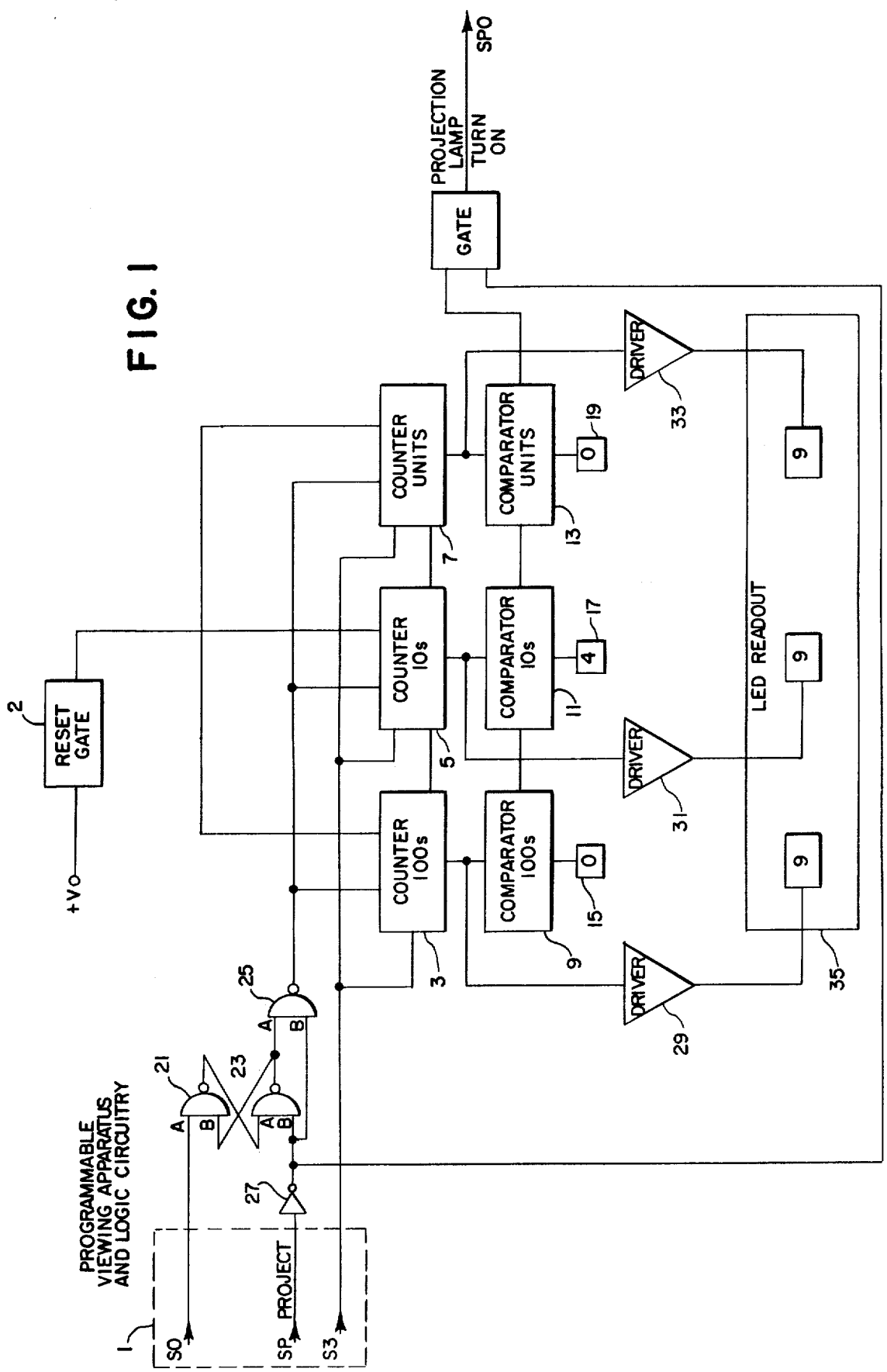
FIG. 1 is a circuit diagram of the counting circuit for determining the position of the film in the cassette in accordance with the count and controlling the turn-on of the projector lamp.

The general organization of components incorporated in the cinematographic system of the viewing apparatus is described in detail in the aforenoted U.S. Pat. No. 4,118,737 and will not be repeated herein. FIG. 39 of this patent illustrates the interconnections between the logic circuitry of the viewing apparatus and the other major components of the apparatus. Insertion of a processed cassette in the viewing apparatus 1 applies power to the electric circuitry and to the counting circuit of FIG. 1. Application of power causes the reset gate 2 to reset decade counters 3, 5 and 7 to their initial zero state representing a fully rewound cassette. The decade counters 3, 5 and 7 are connected together to comprise a counter with a capacity of 999 with the counter 3 counting hundreds, counter 5 counting tens, and counter 7 counting units. The counters are connected to corresponding comparators 9, 11 and 13 which are respectively connected to switch registers 15, 17 and 19. These registers contain the binary number equivalent to the predetermined number representing the film lead length. This number has been experimentally determined to be 40. Any number corresponding to a leader length may be stored in the registers.

Three input signals SO, SP and S3 are provided to condition the counters to count in either the forward or reverse direction depending upon the direction of film movement. Signal S3 is provided from the logic circuitry of the viewing apparatus 1 and is generated by a switch which opens and closes once during each revolution of the takeup spool of the cassette. Each switch closure generates a pulse signal causing the counters to count up or down by a single digit depending upon which counting direction the counters have been conditioned to count by the input signal SO and SP applied to NAND gates 21, 23 and 25.

Input signal SP is provided from the logic circuitry 1 to indicate when the apparatus is in the project mode. Signal SP goes high when the viewing apparatus cycles to initiate a project mode and stays high throughout the project mode. It is low during all other modes of operation.

Input signal SO is normally high at all times except when viewer cycles from a rewind operation of an off position prior to commencing a project cycle. As the viewer cycles from rewind to project, it goes through an off position at which time signal SO goes low due to the temporary opening of a program switch associated with the programming disc of the viewing apparatus 1. As the programming disc rotates to its next position, project, the switch closes causing signal SO to again go high. This temporary low signal, as will be explained in greater detail below, assists the circuit of FIG. 1 to condition the count in the correct direction and to compensate for the forward movement of the film after a fast rewind.

When a developed cassette is inserted in the viewer, the counters 3, 5 and 7 are reset to zero by gate 2. At this time, the viewer logic disc and circuitry initiate a project cycle. Input signal SP will thus go high. Signal SO is also high at this time. The high projection signal SP is inverted by inverter 27 so that a low signal is applied to input B of NAND gates 23 and 25. The output of NAND gate 25 will thus be driven high, causing the counters to count in the forward direction in response to each pulse of signal S3. The latter signal, as explained earlier, is generated by the switch closures due to the rotation of the film takeup spool. Accordingly, the count of the counters 3, 5 and 7 represents the number of rotations of the takeup spool and corresponds to the length of film which has been transported to the takeup spool from the supply spool.

The count in the counters is continuously compared with the predetermined number stored in the switch registers 15, 17 and 19 by the comparators 9, 11 and 13. The count in the counters is also continuously displayed by the LED read out 35 provided on the viewing apparatus by drivers 29, 31 and 33 connected between the output of each respective counter and the respective LED of the readout 35.

As explained earlier, the length of the non-useable leader portion of the film strip has been experimentally determined to correspond to a counter of 40. In the present embodiment, the binary equivalent of 40 has been stored in switch registers 15, 17 and 19 which are connected to comparators 9, 11 and 13, respectively. The count in the counters 3, 5 and 7 is thus continuously compared by comparators with respect to the number 40.

Figure 2:
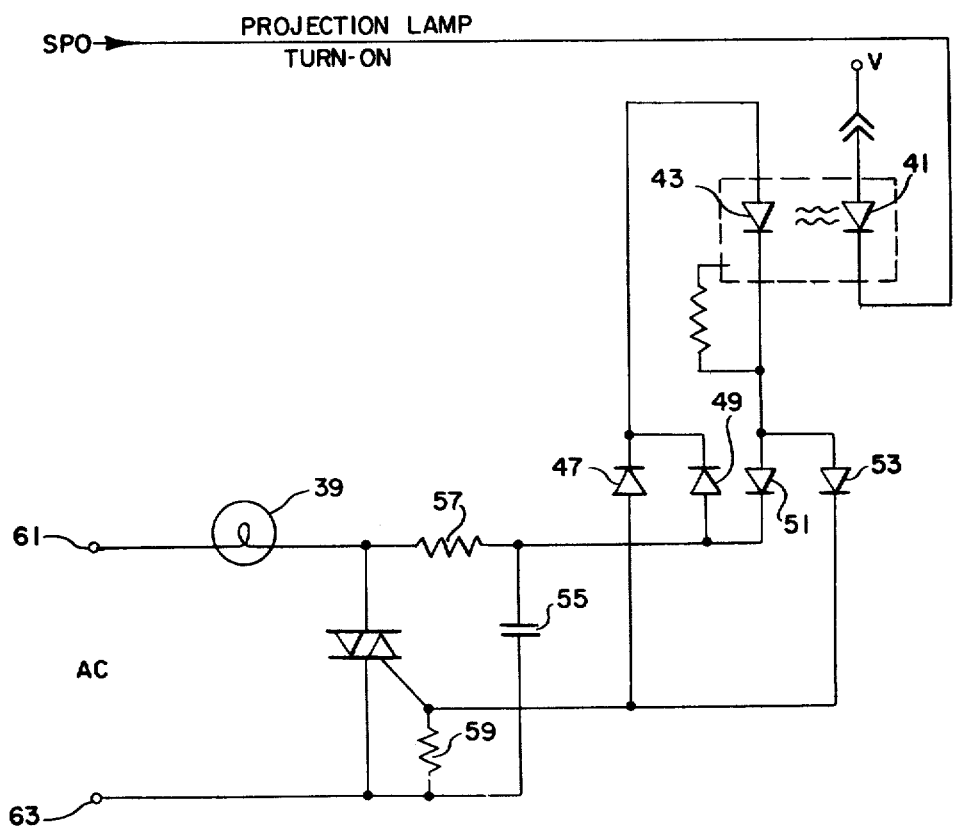
FIG. 2 is a circuit diagram of the projector lamp circuit controlled by the circuit of FIG. 1.

A gate 37 is provided having as one input the output from digit comparator 13. The other input of gate 37 is provided from the inverted project signal SP which is applied to input B of NAND gate 23. Gate 37 is disabled when the count in the counters is at or below 40 indicating that the non-useable leader portion of the film strip would be visible if projected. When the count exceeds 40, the comparators, which have been continuously comparing the count in the counters with the number stored in the switch registers, causes a signal to be generated at the the output of digit comparator 13 which, with the inverted low project signal SP, enables gate 37. The latter will generate an SPO output signal for turning on the projection lamp 39 as is described below in connection with FIG. 2.

The SPO signal from gate 37 energizes a light emitting diode 41. The light radiated by the diode 41 will turn on a light responsive SCR 43. The firing of the SCR 43 will energize the TRIAC 45 which in turn will energize the projection lamp 39 from the terminal 61 and 63 of the AC power supply.

A full wave rectifier comprising diodes 47, 49, 51 and 53 is employed to rectify the AC current applied to the SCR 43. When terminal 61 is positive, current can flow from terminal 61 through the projection lamp 39, a resistor 57, the diode 49, the SCR 43, the diode 53, the resistor 59 and to the negative terminal 63. When the latter terminal 63 is positive, however, current can flow from terminal 63 through resistor 59, the diode 47, through the SCR 43, the diode 51, the resistor 57 and through the lamp 39 to terminal 61.

The projection lamp 39 is thus continuously energized during each project cycle whenever the count is above 40 indicating that the non-useable leader portion has passed between the supply and takeup spool and would no longer be visible. Alternatively, whenever the count is at or below 40 at the start or during a project cycle, the disablement of gate 37 will prevent the projection lamp from turning on during the project cycle until the count exceeds 40.

Turning again to FIG. 1, after a projection cycle has been completed, the viewer logic disc cycles to rewind at which time the project SP signal goes low. The SO input signal remains high at this time. The low SP signal is inverted to a high signal by inverter 27.

During the preceding project cycle, the output of the gate 23 was high as a result of the low applied to the input B thereof. As a result, the gate 21 during the preceding project cycle had highs applied to both the A and B inputs thereof so that the output of the gate 21 was low. Accordingly, at the end of the project cycle, when the SP signal goes low causing a high to be applied to the input B of the gate 23, the output of the gate 23 will remain high as a result of the low applied to the input A of the gate 23. Thus, both inputs A and B of NAND gate 25 will be high and its output will go low. The low output of NAND gate 25 is applied to each counter causing the counters to count down upon receipt of each S3 pulse during rewind. The count will represent the position of the film as it is rewound.

The rewind is at a high speed causing a spring effect on the film following rewind. This spring effect causes the film to be advanced in the forward direction from the supply to takeup spool prior to the initiation of the next project cycle. This forward spring or coil effect on the film may occur after every fast rewind, including a partial rewind initiated for instant replay of a portion of the film strip. The SO signal is advantageously employed at this time to ensure that the count is accurately controlled to compensate for the forward movement of the film during the off position at the end of a fast rewind.

As discussed earlier, when a rewind mode occurs, either at the end of a complete projection cycle or upon selection of the instant replay operation, the film will rewind from the takeup spool to the supply spool and the counters will be conditioned to count in the reverse direction and thus determine the position of the film by the reversing count in the counters and displayed on the viewer by LED 35. When fast rewind is terminated, either after a complete rewind of the film following a projection cycle or partial rewind due to activation of the instant replay mode, the viewer logic disc will cycle from the rewind position to an off position prior to the commencement of another projection cycle.

During the off position of the logic disc, the SO signal temporarily goes low. The project SP signal is also low. The low project SP signal is inverted by inverter 27 to a high signal applied to input B of NAND gate 23 and to input B of NAND gate 25.

The low SO signal applied to input A of NAND gate 21 causes the output of the NAND gate 21 to go high thus applying a high to the input A of the NAND gate 23. The NAND gate 23 thus having highs applied to both inputs will apply a low to the input A of the NAND gate 25.

The NAND gate 25 will thus have a low input signal at A and a high input signal at B causing its output to go high. The high output from gate 25 conditions each of the counters 3, 5 and 7 to count in the forward direction. Accordingly, when the projector is in the off position, as the film strip advances forward at the end of a fast rewind due to the spring coil effect, the counters will count in the forward direction for each pulse of signal S3 representing a rotation of the takeup spool in the forward direction. An accurate count of the film strip's position is thus maintained even during the film movement in the off position.

The projection lamp 39 is kept off when the projector is in the off position since the projection signal SP applied to gate 37 is high indicating a low SP signal or a non-projection mode. When the logic disc then cycles from the off position to project, the high SP signal is inverted to a low signal by inverter 27 and is applied to gate 37. If the count is above 40, the output signal from comparator 13 will enable gate 37 and cause the projection lamp 39 to turn on immediately. If the count in the counters is at or below 40, gate 37 will not provide an output signal SPO, thus preventing projection lamp turn on until the count again exceeds 40 during the projection cycle.

Accordingly, whenever a fully rewound cassette is inserted in the viewing apparatus, the counters are reset to zero and the projection lamp turn-on is delayed during the project cycle until the count in the counters exceeds 40, representing the length of the non-useable film leader portion. When this leader portion length has passed the projection aperture of the apparatus, the count will exceed 40 and the projection lamp will immediately be turned on for viewing the visible transparencies in the film strip. The projection lamp is also immediately turned on whenever a projection cycle is initiated when the film position is above the count of 40. Thus, after an instant replay rewind, the projection lamp will immediately turn on at the commencement of the next projection cycle as long as the film has not been rewound to the point where the leader portion would be visible or below the count of 40. If the latter occurs during instant replay rewind, the above-described circuit will prevent projection lamp turn on during the project cycle until the count again exceeds 40.

While the invention has been described and illustrated with regard to discrete components, it should be noted that it would be advantageous to utilize a microprocessor fed by the three signals SO, SP and S3 to produce the indicated count and the output signal SPO in a manner similar to the functional logic described with regard to FIG. 1.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. In a cinematographic method of operating a film cassette having opposite ends of an elongated film strip affixed to a supply spool and a takeup spool respectively by operating the cassette through repeated cycles comprised of alternately rotating the spools to transport the film strip for projection during a forward operation and to transport the film strip in an opposite direction during a rewind operation, the improved method comprising the steps of:

sensing the revolutions of one of said spools;

responsive to each revolution of said one spool, incrementing a digital count in one direction during forward operations, in the opposite direction during rewind operations, and again in the one direction immediately at the end of rewind operations and prior to the start of an additional forward operation so that the position of the film strip is continuously measured with respect to said count; and controlling the energization of a projection lamp during forward movement of said film strip depending upon whether the count is above or below a predetermined number so as to preclude projection of the end portion and to project image frames located on said film strip adjacent the end portion.

2. In a projection apparatus for operating a film cassette having opposite ends of an elongated photographic film strip respectively affixed to a takeup and supply spool, said apparatus having means for rotating said spools to repeatedly advance said film strip in one direction during a forward operation across a projection station having a projection lamp for illuminating said film strip for viewing of said image frames, and in a reverse direction during a rewind operation for returning said film strip back onto said supply spool, the improvement comprising:

means for continuously measuring the position of said film strip in said cassette by providing a digit count responsive to rotation of one of said spools, said measuring means including means for incrementing said count in one direction during one operation, in the opposite direction during the other operation, and again in said one direction immediately following said other operation and prior to the next one operation so as to maintain control of the count for any inadvertent film movement between operations.

3. In a projection apparatus for operating a film cassette having opposite ends of an elongated photographic film strip affixed to a takeup and supply spool, said strip having a useable portion containing acceptable image frames located after a predetermined length of a leading portion of said film strip, said apparatus having means for rotating said spools to repeatedly advance said film strip in one direction during a forward operation, whereby said leading and useable portions are advanced from said supply spool to said takeup spool across a projection station having a projection lamp for illuminating said film strip for viewing of said image frames, and in the reverse direction during a rewind operation for returning said film strip back onto said supply spool, the improvement comprising:

means for continuously measuring the position of said film strip in said cassette by providing a digit count responsive to rotation of only one of said spools, said measuring means including means for incrementing said count in one direction during a forward operation, in the opposite direction during a rewind operation, and again in said one direction immediately following said rewind operation and prior to the next forward operation so as to maintain an accurate control of the count for any inadvertent film movement between operations;

comparison means for continuously comparing said digit count with a predetermined number corresponding to a count representative of said predetermined length of said leading portion; and control means for controlling energization of said projection lamp during forward movement responsive to said comparison means when said digit count exceeds said predetermined number.

4. The improvement of claim 3, wherein said measuring means comprises a counter which is incremented in response to a signal generated during each revolution of said takeup spool, said counter is conditioned to increment upward in response to signals generated in the apparatus indicating forward operation or an off position, and downward in response to a signal generated in the apparatus indicating rewind operation.

5. The improvement of claim 4 including means for continuously displaying the count in the counter, said displaying means including a light emitting diode readout provided in the projection apparatus.

6. The improvement of claim 3, wherein said measuring means comprises a counter and means for generating a first signal when said apparatus is in a first condition for advancing said film in said one direction, for generating a second signal when said apparatus is in a second condition for advancing said film in said reverse direction, and a third signal when said apparatus is in a condition intermediate said first and second conditions, and logic circuitry for conditioning the counter to increment in an upward direction when said first signal is present, in the opposite direction when said second signal is present, and also in said upward direction when said third signal is present at the off position between rewind and forward movement.

7. The improvement of claim 6, wherein said control means includes an electronic gating means which is enabled by a signal from said comparison means when the count is above said predetermined number and when said first signal is present, and said gating means providing an output signal for energizing said projection lamp when said gating means is enabled.

* * * * *